United States Patent [19]

Kiuchi et al.

[11] 4,302,090
[45] Nov. 24, 1981

[54] ANTIBOUNCE DEVICE FOR ELECTROMAGNETICALLY DRIVEN SHUTTER

[75] Inventors: Masayoshi Kiuchi, Yokohama; Nobuaki Date; Syuichiro Saito, both of Kawasaki, all of Japan

[73] Assignee: Canon Kabushiki Kaisha, Tokyo, Japan

[21] Appl. No.: 133,984

[22] Filed: Mar. 26, 1980

[30] Foreign Application Priority Data

Mar. 30, 1979 [JP] Japan .................................. 54-39068

[51] Int. Cl.³ ............................................. G03B 9/62
[52] U.S. Cl. .................................... 354/234; 354/252
[58] Field of Search ................ 354/234, 235, 252, 251

[56] References Cited

U.S. PATENT DOCUMENTS 3,604,330 9/1971 Fahlenberg et al. ................ 354/235

Primary Examiner—Michael L. Gellner
Attorney, Agent, or Firm—Toren, McGeady & Stanger

[57] ABSTRACT

An antibounce device for an electromagnetically driven shutter of a camera in which a braking current flowing in the direction reverse to the direction of a driving current is supplied to a shutter blade driving coil for a predetermined period of time immediately before completion of the travel of shutter blades.

6 Claims, 4 Drawing Figures

ANTIBOUNCE DEVICE FOR ELECTROMAGNETICALLY DRIVEN SHUTTER

BACKGROUND OF THE INVENTION

1. Field of the Invention

This invention relates to an electromagnetically driven shutter for a camera which has the blades thereof driven by an electromagnetic force.

2. Description of the Prior Art

The conventional shutter mechanism for a camera comprises a shutter blade part having a light shielding property, a driving part consisting of a shutter blade driving spring or the like, a control part for controlling the shutter time and a winding part for setting each of these parts into a predetermined state.

Meanwhile, the advancement of applications of electronics to cameras has prompted arrangement to lessen the number of parts required and, as seen in the so-called electronic shutter, the shutter time control part has come to be changed from a mechanical shutter time control mechanism to an electromagnetic shutter time control mechanism. However, the shutter blade part, the driving part and the winding part in general have remained unchanged from their mechanical arrangement. In the conventional electronic shutter, therefore, the complexity of these mechanical parts has been causing a high cost, frequent troubles and other disadvantages. Besides, these mechanical parts have necessitated a mechanical interlocking arrangement with other mechanisms and thus design work on a camera has been greatly restricted because of the mechanical interlocking arrangement required.

To solve this problem, there has recently been proposed and put to a practical use an improvement on the shutter mechanism wherein the shutter blades are directly and electromagnetically driven to obviate the necessity of the shutter blade winding part and the driving part is arranged to serve also as control part to permit simplification of the structural arrangement of the shutter mechanism, reduction in the number of required parts, reduction in cost and allowing a greater degree of latitude for design work.

Generally, the shutter blade part of such an electromagnetically driven shutter bounce upon completion of its travel. To prevent such a bounce, it is first conceivable to use a friction brake or an antibounce claw as seen in the conventional spring driven shutter. However, these conventional antibounce members not only require delicate adjustment work but also are inferior in durability and cause a high cost of manufacture. In addition to such disadvantages, they necessitate the use of a complex interlocking mechanism for bringing these operating member back to their initial positions.

SUMMARY OF THE INVENTION

It is a general object of the present invention to provide an antibounce device for an electromagnetically driven shutter which solves the above stated problems of the conventional shutters and is characterized in that: a braking force is applied to either a front blade or a rear blade of the electromagnetically driven shutter by allowing a reverse current to flow to a driving coil in action immediately before completion of the travel of the shutter blades.

The above and further objects and novel features of the invention will be apparent from the following detailed description of an embodiment thereof with reference to the accompanying drawings.

DETAILED DESCRIPTION OF PREFERRED EMBODIMENT

Figure 1:
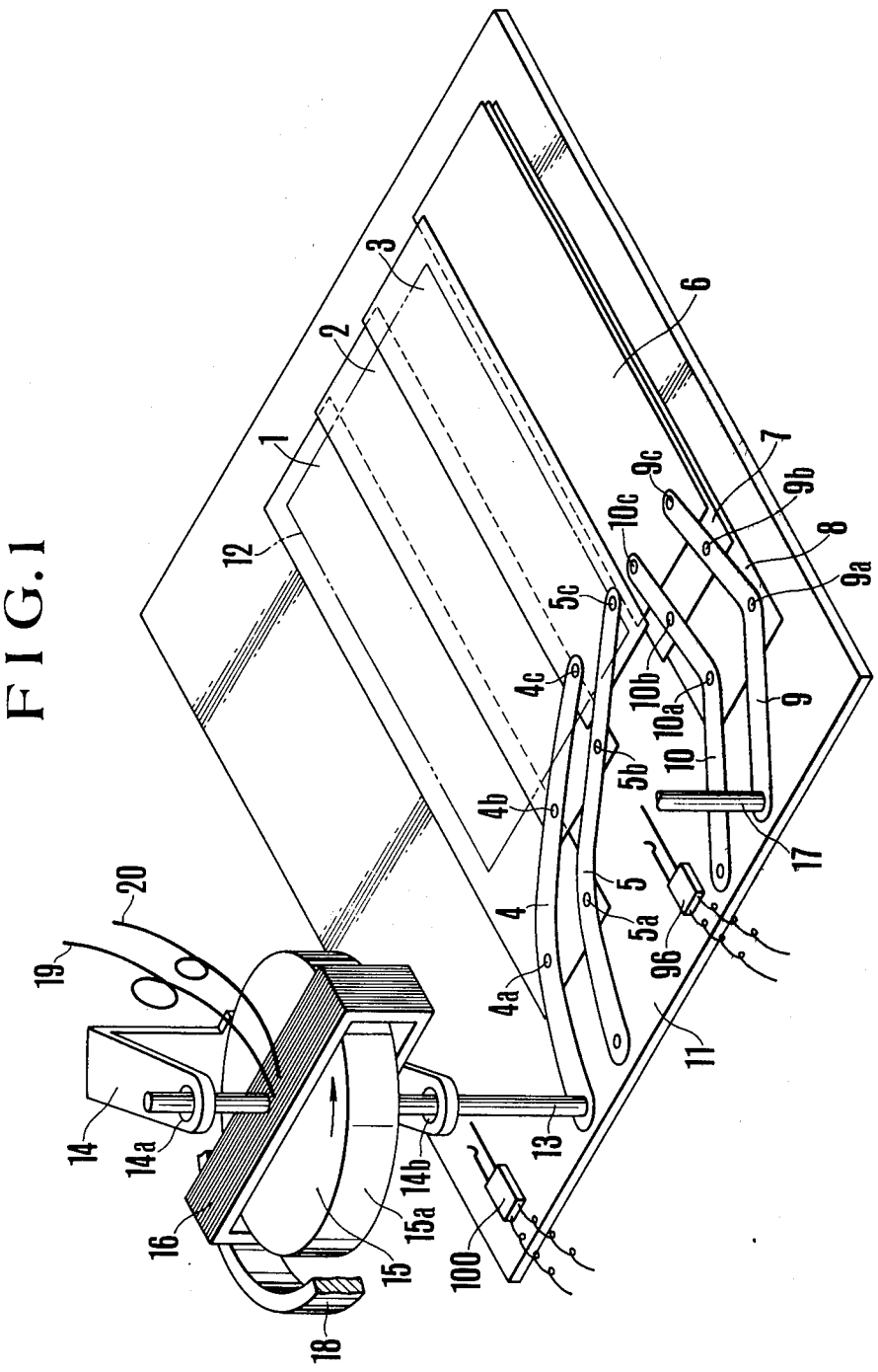
FIGS. 1 and 2 are oblique views showing essential parts of a camera to which the present invention is applied.

In FIG. 1, which is an oblique view showing an automatic exposure, TTL full-open light measuring, aperture preference type single-lens reflex camera provided with a meter type electromagnetic driving part to which the present invention is applied as an embodiment thereof, the shutter of the camera is illustrated as being in a charged state. Further, FIG. 1 shows only a front blade driving part with a rear blade driving part being omitted for the sake of illustration and to facilitate understanding thereof.

In FIG. 1, a shutter base plate 11 is provided with an exposure window 12. There are provided front blade driving arms 4 and 5. One end of the arm 4 is rotatably attached to a front blade driving shaft 13, which is pivotally attached to the shutter base plate 11. One end of the above stated arm 5 is pivotally attached to the shutter base plate 11. The arms 4 and 5 have light shielding thin plate-like front blades 1, 2 and 3 rotatably attached thereto by means of pins 4a, 4b, 4c, 5a, 5b and 5c.

There are also provided rear blade driving arms 9 and 10. One end of the arm 9 is secured to a rear blade driving shaft 17. The arm 9 and the shaft 17 are pivotally attached to the shutter base plate 11. Further, one end of the arm 10 is also pivotally attached to the shutter base plate 11. The arms 9 and 10 have light shielding thin plate-shaped rear blades 6, 7 and 8 rotatably attached thereto by means of pins 9a, 9b, 9c, 10a, 10b and 10c. A permanent magnet 15 which is magnetized in the direction of its diameter is secured to a frame 14, which is secured either to the shutter base plate 11 or to a rigid member within the camera by means of a member which is not shown. The front blade driving shaft 13 has a front blade driving coil secured thereto and is loosely fitted in support holes 14a and 14b which are formed in the frame. A yoke 18 confronts the periphery 15a of the permanent magnet 15 leaving a space between it and the periphery 15a of the permanent magnet 15 to permit the driving coil 16 to be freely rotatable through the space. There are provided a front blade brake signal switch 100 and a rear blade brake signal switch 96 which are arranged to change from their open states to closed states before completion of the travels of these blades respectively. They are immovably positioned and arranged to form a magnetic circuit.

Figure 2:
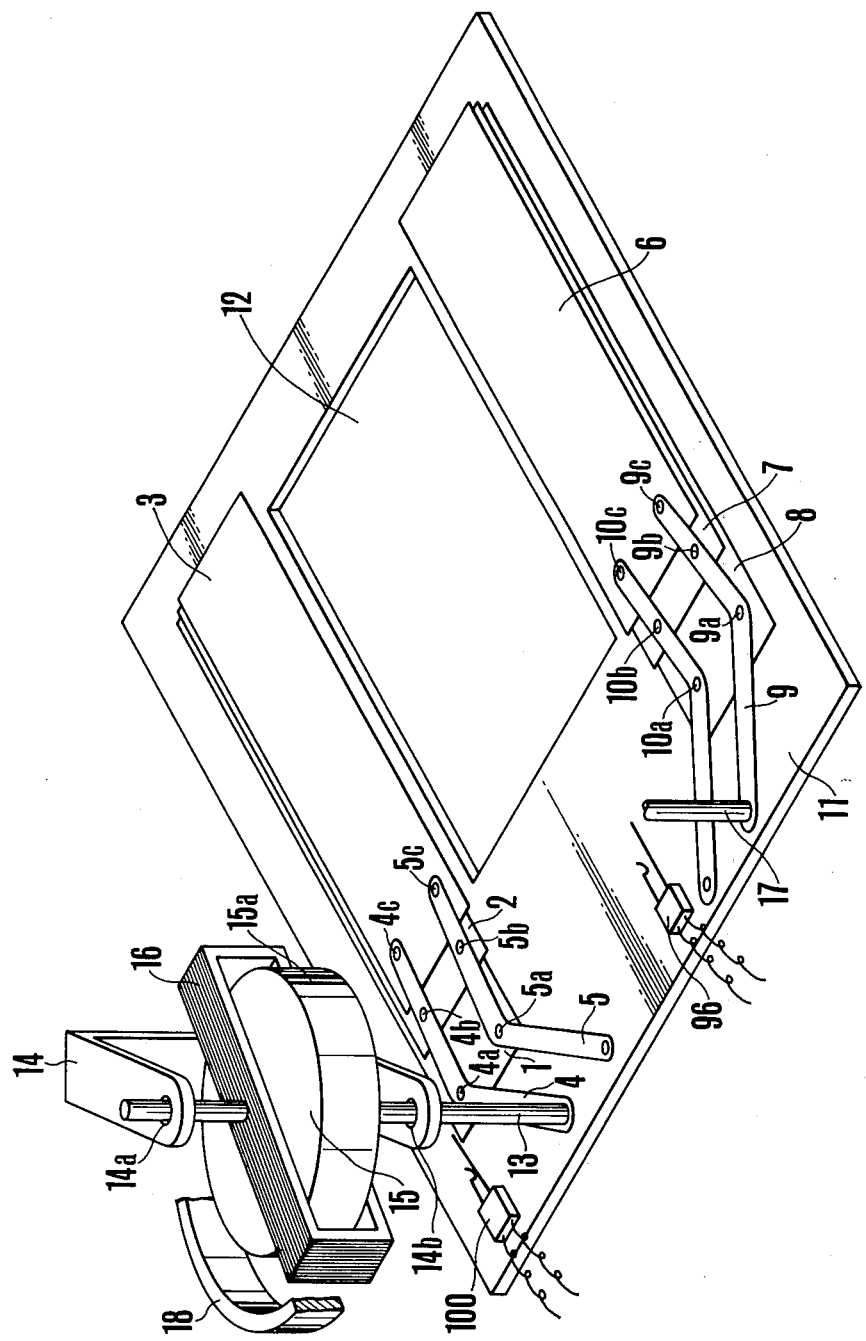

FIG. 2, which is also an oblique view, shows the same embodiment of the invention as in a state of having the exposure window 12 opened with the front blades 1, 2 and 3 moved away therefrom.

Figure 3:
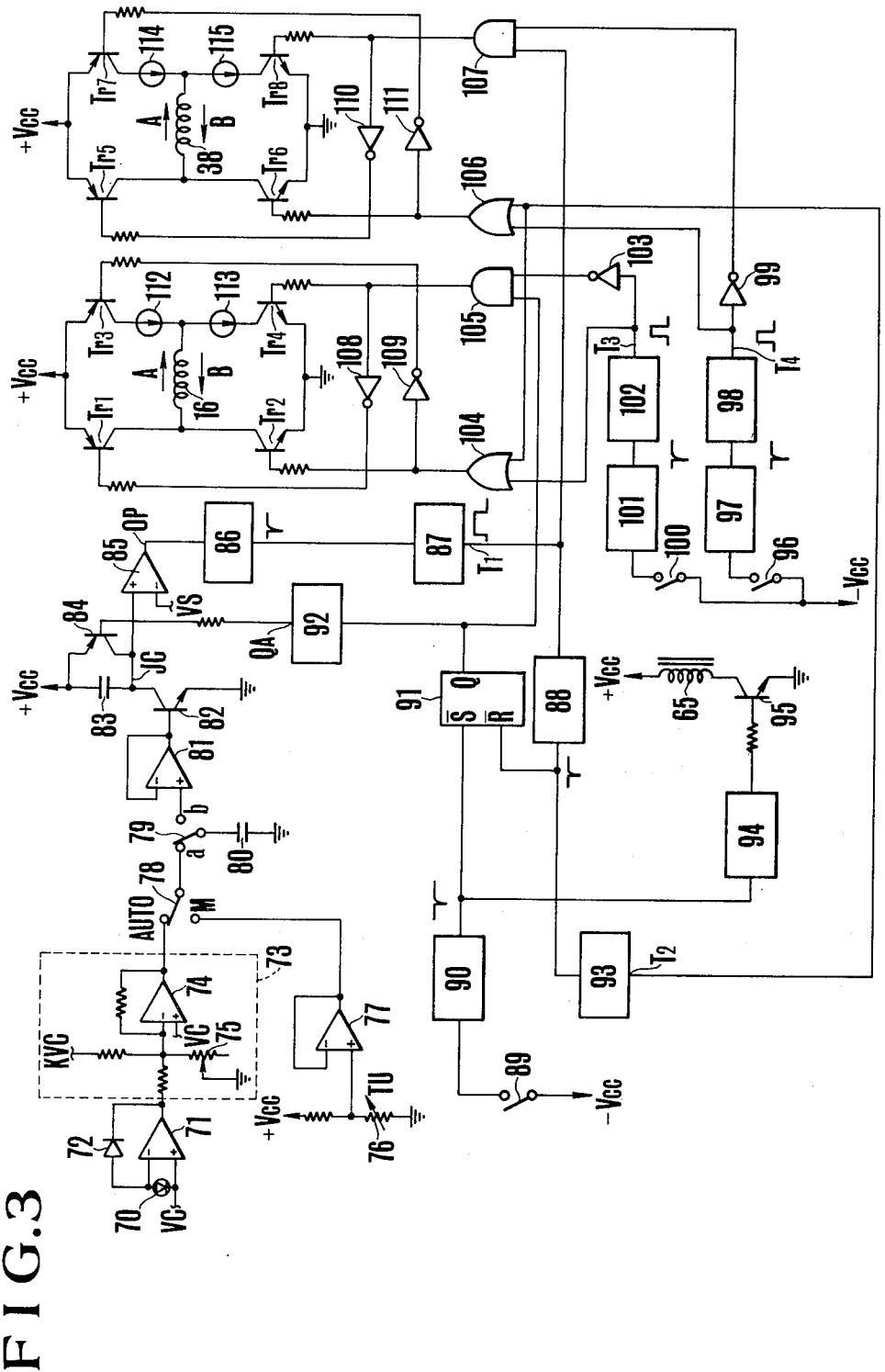
FIG. 3 is an electrical circuit diagram of the camera shown in FIG. 1.

In FIG. 3, which shows an electrical circuit diagram of the camera shown in FIGS. 1 and 2, the circuit is arranged as follows: there is provided a photogalvanic element 70 (hereinafter will be called SPC for short) which is arranged to receive a transmission light coming through a photograph taking lens which is not shown. An operational amplifier 71 (hereinafter will be called OP amplifier) serves as SPC head amplifier with the above stated SPC connected to the two input terminals thereof and with a diode 72 for logarithmic suppression connected to the negative feedback route thereof. A reference numeral 73 indicates a known OP amplifier. Another OP amplifier 74 is arranged to form a part of an operation circuit 73 while a resistor 75 is arranged to form another part of the operation circuit 73. The resistor 75 is provided for setting the number of steps ($\Delta Av$) by which diaphragm aperture is stopped down by aperture presetting and also for setting the ASA sensitivity information (Sv) of the film being used. The output terminal of the operational amplifier 73 produces information (Tv) on the number of steps of the shutter time by which the shutter time is to be controlled. There are provided a variable resistor 76 for setting shutter speed; an OP amplifier 77 which forms a voltage follower; an automatic-manual selection switch 78; a capacitor 80 for memorizing the information Tv; a change-over switch 79 which is normally connected to a contact a and is arranged to shift to another contact b in response to the start of an upward movement of a quick return mirror which is not shown; an OP amplifier 81 which forms another voltage follower; a transistor 82 for logarithmic extension, the transistor 82 having a time constant capacitor 83 connected to its collector; a switching transistor 84 for starting a counting operation; an OP amplifier 85 which forms a comparison circuit and has its non-inversion input terminal connected to the collector of the above stated logarithmic extension transistor 82 while its inversion input terminal is arranged to have a reference voltage VS impressed thereon; a differentiation circuit 86 which is connected to the output terminal of the comparison circuit 85; a monostable multivibrator 87 (hereinafter will be called the one shot circuit) which is arranged to be triggered by a negative differentiation pulse produced by the above stated differentiation circuit 86 to retain its output at a high level for a predetermined period of time, 20 ms for example; and a differentiation circuit 88 which is connected to the output terminal of the one shot circuit 87.

A normally open switch 89 is arranged to be closed upon completion of the upward movement of the quick return mirror. With the switch 89 closed, a negative differentiation pulse is produced from another differentiation circuit 90 which is arranged at the next stage. A reference numeral 91 indicates an RS flip-flop circuit which has its set input terminal connected to the output terminal of the above stated differentiation circuit 90 while the output terminal Q of the flip-flop circuit 91 has a delay circuit 92 connected thereto. The output terminal QA of the delay circuit 92 is connected to the base of the above stated count starting switching transistor 84 through a resistor. There is provided another one shot circuit 98 which is connected to the output terminal of the above stated differentiation circuit 88 and is arranged to be triggered by a negative differentiation pulse produced from the differentiation circuit 88 to retain its output at a high level for a predetermined period of time, such as 20 ms. The output terminal of the above stated differentiation circuit 90 has a reset circuit 94 connected thereto. The output terminal of the reset circuit 94 is connected to the base of an aperture controlling transistor 95 through a resistor. The collector of the transistor 95 is connected to a power source through an aperture controlling magnet 65. Numerals 96 and 100 indicate the above stated switches which are arranged to detect the states of the rear and front blades immediately before completion of their travels. With the switches 96 and 100 closed, the differentiation circuits 97 and 101 which are disposed at the next stage produces negative differentiation pulses to trigger monostable multivibrators 98 and 102 (hereinafter will be called one shot circuits) therewith. The one shot circuits 98 and 102 are thus arranged to retain their outputs at a high level for a predetermined period of time, 5 ms for example. Inverters 99 and 103 are connected to the output terminals of the one shot circuits 98 and 102 respectively.

Numerals 104 and 106 indicate OR circuits; 105 and 107 indicate AND gates; and 108 and 110 indicate inverters connected to the output terminals of the AND gates 105 and 107.

There are provided a bridge arrangement of transistors Tr1–Tr3; a front shutter blade driving coil 6 which is shown in FIGS. 1 and 2; and a rear shutter blade driving coil 38. The coil 16 is connected between the collectors of the switching transistors Tr1 and Tr2 and the collectors of the transistors Tr3 and Tr4. The other coil 38 is connected between the collectors of the switching transistors Tr5 and Tr6 and those of the switching transistors Tr7 and Tr8. In the drawing, an arrow mark A indicates the direction in which a current is arranged to flow when the shutter is allowed to travel while an arrow mark B indicates the direction in which a current flows when the shutter is to be reset. Numerals 112, 113, 114 and 115 indicate constant current circuits. The base of the switching transistor Tr4 is connected to the output terminal of the inverter 108; the base of the switching transistor Tr2 is connected to the output terminal of the OR circuit 104; the base of the switching transistor Tr3 is connected to the output terminal of the inverter 109; the base of the transistor Tr4 is connected to the output terminal of the AND circuit 105; that of the transistor Tr5 is connected to the output terminal of the inverter 110; that of the transistor Tr6 is connected to the base of the OR circuit 106; that of the transistor Tr7 is connected to the output terminal of the inverter 111; and that of the transistor Tr8 is connected to the output terminal of the AND circuit 107, the base of each of these transistors being connected to the above stated output terminal through a resistor.

Referring now to the time chart of FIG. 4, the camera which is arranged as described in the foregoing operates as follows:

At the output terminal of the SPC head amplifier 71, there is produced a voltage which corresponds to the brightness Bv of an object to be photographed and also corresponds to the full-open F number value Avo of the photograph taking lens. The output voltage thus obtained is computed at the operation circuit 73 at the next stage together with the information $\Delta Av$ on the number of stopped down steps of the preset aperture and the information Sv on the ASA sensitivity of the film in use. Then, at the output terminal of the operation circuit 73, there is produced a voltage corresponding to the information Tv on the shutter speed to which the shutter is to be controlled. This voltage is supplied to the memorizing capacitor 80 through the switches 78 and 79 and is stored at the capacitor 80.

Next, when a shutter release operation is performed, a driving voltage is supplied to each control circuit. Concurrently, a means which is not illustrated in the drawing causes the quick return mirror which is also not shown to begin the upward movement thereof. Then, as will be understood from the wave form 79 shown in FIG. 4, the movable contact of the change-over switch 79 comes into contact with the contact b. This causes the output terminal of the OP amplifier 81 to produce the voltage stored at the above stated memorizing capacitor 80. Upon completion of the upward movement of the quick return mirror at the point of time as shown in FIG. 4, the above stated switch 89 is closed (see FIG. 4) to cause the output terminal of the differentiation circuit 90 to produce a negative differentiation pulse. The RS flip-flop circuit is set by this pulse as shown by 91 in FIG. 4. The output Q of the flip-flop circuit 91 is then inverted from a low level (hereinafter will be called "0") to a high level (hereinafter will be called "1"). Since the switch 100 is open then, the level of the output of the inverter 108 is "1", Therefore, with the output Q of the RS flip-flop circuit 91 inverted to "1", the output level of the AND circuit 105 becomes "1" and the output level of the inverter 108 becomes "0". The driving transistors Tr1 and Tr4 are then inverted into a conductive state to allow a driving current which is determined by the constant current circuit 113 to flow to the driving coil 16 for driving the front shutter blades 1, 2 and 3 in the direction indicated by the arrow mark A.

Further the negative differentiation pulse from the differentiation circuit 90 inverts the output of the reset circuit 94 from a high level "1" to a low level "0". The transistor 95 is then rendered nonconductive by this and the aperture controlling magnet is deenergized.

Figure 4:
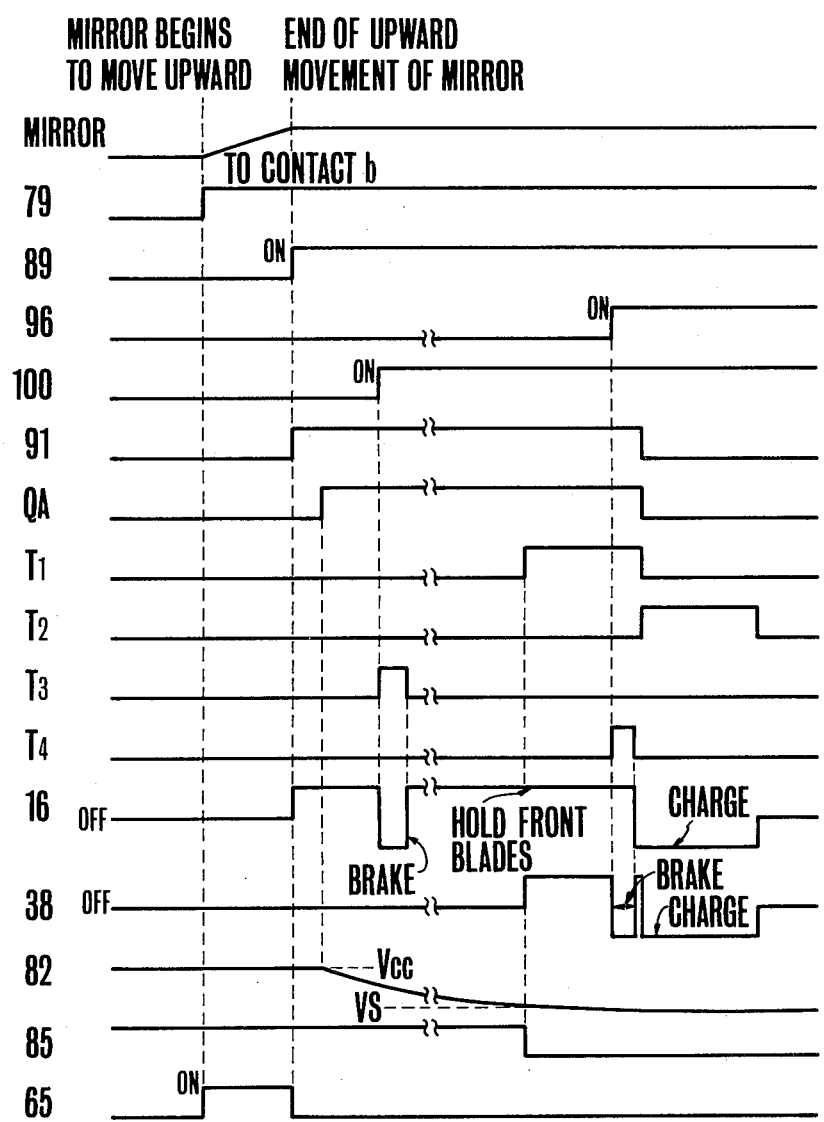
FIG. 4 is a time chart showing the wave form of each part of the circuit shown in FIG. 3.

Referring to 16 in FIG. 4, when the driving current is allowed to flow to the driving coil 16 through lead wires 19 and 20 which are shown in FIG. 1, the driving coil 16 rotates counterclockwise. This causes the front blade driving shaft 18 which is secured to the driving coil to rotate also counterclockwise. Then, the front blade driving arms 4 and 5 sway counterclockwise. A link mechanism then causes the front shutter blades to move upward to the left to uncover the exposure window 12 and the film begins to be exposed. When the front shutter blades 1, 2 and 3 close to the end of their travel, the front shutter blade 1 comes to push the movable contact piece of the switch 100 shown in FIG. 2. The switch 100 is closed by this to cause the differentiation circuit 101 to produce a negative differentiation pulse. Then, the output of the one shot circuit 102 becomes a high level and remains so for a predetermined period of time, 5 ms for example. The level of the output of the inverter 103 becomes "0". At this point of time, the level of the output Q of the flip-flop circuit 91 is "1" (see 91 of FIG. 4). However, the closing action on the switch 100 as mentioned in the foregoing causes the level of the output of the inverter 103 to be "0" and that of the output of the inverter 108 to be "1" for a predetermined period of time respectively. Accordingly, the transistors Tr1 and Tr4 are changed from their conductive states to non-conductive states and remain nonconductive for a predetermined period of time. The current supply to the front shutter blade driving coil 16 in the direction of the arrow mark A, therefore, is cut off also for a predetermined period of time. Further, at the same point of time, the output of the above stated one shot circuit 102 causes the level of the output terminal of the inverter 109 to be "0" and that of the output of the OR circuit 104 to be "1" for a predetermined period of time to make the transistors Tr2 and Tr3 conductive for the predetermined period of time. The direction of the electric current flow to the coil 16 is, therefore, changed as shown at 16 in FIG. 4 and thus a braking current which flows in the direction reverse to the direction of the driving current is allowed to flow to the coil 16 for a predetermined period of time. When the braking current flows to the coil 16 in the direction reverse to the direction A of the driving current, there is generated a force which is in the direction reverse to the direction of a previously generated force at the driving coil 16. This reverse force then imparts a force which is reverse to a previously exerted force to the front blade driving shaft 13 and the front blade driving arms 4 and 5. Accordingly, a force is exerted on the front blades 1, 2 and 3 in the direction reverse to the travelling direction of these blades. As a result of this, a braking force is applied to the front blades 1, 2 and 3 and then the shutter blades are thus arranged to reach the end of their travel under the braking force. At about the same time as the arrival of the shutter blades, the level of the output terminal of the one shot circuit 102 changes from "1" to "0". Then, the level of the output terminal of the OR circuit 104 also changes from "1" to "0". The transistors Tr2 and Tr3 are changed to a nonconductive state and the current supply to the coil 16 in the direction of the arrow mark B is stopped. Concurrently, the inversion of the one shot circuit 102 causes the output level of the AND circuit 105 to change from "0" to "1" to make the transistors Tr1 and Tr4 conductive. The current supply to the coil 16 in the direction of the arrow mark A is then resumed and the front shutter blades 1, 2 and 3 are held at the end of their travel.

On the other hand, the level of the output QA of the delay circuit 92 becomes "1" a little later than the inversion of the output Q of the flip-flop circuit 91 (see QA in FIG. 4) and the switching transistor 84 is rendered nonconductive by this. With this arrangement, the time constant capacitor 83 begins to be charged concurrently with the beginning of the above stated exposure. The time constant capacitor 83 is charged with a current which is obtained by logarithmic extension of the output voltage of the above stated OP amplifier and the terminal level voltage JC of the capacitor 83 gradually decreases (see 82 in FIG. 4). When this voltage JC becomes lower than the inversion input voltage Vs of the OP amplifier 85, the level of the output OP of the OP amplifier come to change from "1" to "0". This causes the differentiation circuit 86 to produce a negative differentiation pulse. The one shot circuit 87 which is disposed at the next stage is triggered by this pulse. Then, the output terminal T1 of the one shot circuit 87 remains at a high level for a predetermined period of time, 20 ms for example (see T1 in FIG. 4). When the output terminal T1 of the one shot circuit 87 comes to be at a high level, the output of the one shot circuit and that of the inverter 99 cause the level of the output of the AND circuit 107 to be "1" and that of the output of the inverter 110 to be "0". By this, the transistors Tr5 and Tr8 are rendered conductive to allow a constant current determined by the constant current circuit 115 in the direction of the arrow mark A to begin to flow to the rear shutter blade driving coil 38. Then, in the same manner as the front shutter blades, the rear shutter blades 6, 7 and 8 travel upward to the left in front of the exposure window 12. The exposure window 12 begins to be covered by the rear shutter blades 6, 7 and 8 according as they travel.

When the rear blades 6, 7 and 8 come close to the end of the travel, the blade 8 pushes the movable contact piece of the rear blade brake signal switch 96 so as to have the switch closed thereby. With the switch 96 closed, the differentiation circuit 97 produces a negative differentiation pulse to trigger thereby the one shot circuit 98. Then, the level of the output terminal T4 of the one shot circuit 98 becomes "1" for a predetermined period of time, 5 ms for example. The level of the output terminals of the inverter 99 and the AND circuit 107 becomes "0" also for a predetermined period of time. The level of the output terminal of the AND circuit 107 then becomes "1" for a predetermined period of time and the transistors Tr5 and Tr8 are rendered nonconductive for the predetermined period to have the current supply in the direction of the arrow mark A to the rear shutter blade driving coil 88 stopped for the predetermined period.

Concurrently with the stoppage of the current supply, the transistors Tr6 and Tr7 become conductive for a predetermined period of time to effect a switch-over of the direction of the driving current supply to the coil 38. Thus, a constant current in the direction of the arrow mark B is allowed to flow to the coil 38 for a predetermined period of time and the rear shutter blades 6, 7 and 8 are thus put under a braking force until they come to the end of their travel in the same manner as in the case of the front shutter blades.

Upon arrival of the rear shutter blades 6, 7 and 8 at the end of their travel, the level of the output terminal of the one shot circuit 98 immediately changes from "1" back to "0". The levels at the output terminals of the AND circuit 107 and the OR circuit 106 are then inverted to effect again a switch-over of the direction of the driving current supply to the rear blade driving coil 38. By this switch-over, the driving current in the direction of the arrow mark A is again allowed to flow to retrain the rear shutter blades 6, 7 and 8 at the end of their travel without fail. With this an exposure operation is completed.

After that, when the level at the output terminal T1 comes back to "0" from "1" to bring the shutter back to its initial position, the level of the output terminal of the AND circuit comes to change from "1" to "0" and, at the same time, a negative pulse from the differentiation circuit 88 resets the flip-flop circuit 91. The level of the output terminal of the AND circuit 105 then changes from "1" back to "0". When the levels of the two AND circuits 105 and 107 change from "1" to "0" as mentioned in the foregoing, this renders the driving transistors Tr1, Tr4, Tr5 and Tr8 for the coils 16 and 38 nonconductive to cut off the current supply in the direction of the arrow mark A to each of these coils 16 and 38.

As mentioned in the foregoing, when a negative pulse is produced from the differentiation circuit 88, the level of the output terminal of the one shot circuit 98 becomes "1" for a predetermined period of time, 20 ms for example. This brings the level of the output terminal of each of the OR circuits 104 and 106 from "0" to "1". Accordingly, the direction of the current flowing to the coils 16 and 38 is shifted to allow the currents in the direction of the arrow mark B to flow to these coils 16 and 38 in the same manner as described in the foregoing. Then, since both the front and rear shutter blade groups are at the ends of their travels, the current supply in the direction of the arrow mark B brings both of the groups of shutter blades back to their initial positions. Further, since the output current of the constant current circuit 114 is set to be smaller than that of the constant current circuit 112, the current supply to the front shutter driving coil 16 is larger than the current supply to the rear blade driving coil 38. Accordingly, the force of the reset movement of the front blades is greater than that of the rear blades. Therefore, in the process of the reset movement, the rear blades are reset while being pushed by the front blades to ensure that the exposure window 12 is kept completely shielded from light while the shutter is being brought back to its initial position. In the embodiment described in the foregoing, lead wire arrangement is employed as means for power supply to the driving coil. However, the invention is not limited to this arrangement and the lead wire of course may be replaced with a brush or the like or may be replaced with a power supply arrangement through a coil spring as seen in the case of an instrumental meter.

In accordance with the invention, the brake is applied by impressing the braking current of the reverse direction in the shutter blades immediately before completion of their travel, so that the shutter blades can be effectively prevented from bouncing. Further, even after completion of the travel of the shutter blades, the coil is continuously energized to prevent the shutter blades from falling off their positions due to their own weight in whatever conditions they may be mounted.

Since each of the two coils is arranged to receive a reset current for returning the shutter blades to their initial positions after completion of their travel, the shutter blades are automatically or electronically reset into their initial positions.

What is claimed is:

1. In an electromagnetically driven shutter for a camera having shutter blades and a driving means for electromagnetically driving said shutter blades, an improvement thereon comprising:
   a current direction switch-over means which is arranged to change the direction of the driving current of said driving means immediately before completion of the operation of said shutter blades, and wherein said current direction switch-over means includes a switching means which is associated with said shutter blades and is arranged to become operative immediately before completion of the operation of said shutter blades.

2. In an electromagnetically driven shutter for a camera having shutter blades and a driving means for electromagnetically driving said shutter blades, an improvement thereon comprising:
   a current direction switch-over means which is arranged to change the direction of the driving current of said driving means immediately before completion of the operation of said shutter blades, and wherein said current direction switch-over means includes:
   (a) switching means which is associated with said shutter blades and is arranged to become operative immediately before completion of the operation of said shutter blades; and
   (b) a holding member which is responsive to the operation of said switching means and is arranged to retain the changed direction of said current for a predetermined period of time after the switch-over of the current direction has been effected.

3. In an electromagnetically driven shutter for a camera having shutter blades and a driving means for electromagnetically driving said shutter blades, an improvement thereon comprising:

a current direction switch-over means which is arranged to change the direction of the driving current of said driving means immediately before completion of the operation of said shutter blades, and wherein said current direction switch-over means includes a means which is arranged to retain the changed direction of said driving current for a predetermined period of time and then to again effect the switch-over of the current direction in relation to the arrival of said shutter blades at the end of their operation.

4. In an electromagnetically driven shutter for a camera having shutter blades and a driving means for electromagnetically driving said shutter blades, an improvement thereon comprising:
a current direction switch-over means which is arranged to change the direction of the driving current of said driving means immediately before completion of the operation of said shutter blades and then to again change the direction of the driving current in relation to the arrival of said shutter blades at the end of their operation.

5. An electromagnetically driven shutter according to claim 4 wherein said current direction switch-over means includes a switching means which is associated with said shutter blades and is arranged to become operative immediately before completion of the operation of said shutter blades.

6. An electromagnetically driven shutter comprising:
front shutter blades;
a first driving means which electromagnetically drives said front shutter blades from their initial position covering an exposure window to their second position in which said exposure window is uncovered by the front shutter blades;
rear shutter blades;
a second driving means for electromagnetically driving said rear shutter blades from their initial position to a second position thereof in which said exposure window is covered by said rear shutter blades; and
a current direction switch-over means which is arranged to change the direction of the electrical currents of said first and second driving means to have forces imparted to the front and rear blades to reset said front and rear shutter blades into their initial positions after arrival of said rear shutter blades at said second position thereof.

* * * * *